United States Patent [19]

Lampert et al.

[11] Patent Number: 5,579,425

[45] Date of Patent: Nov. 26, 1996

[54] ANTI-SNAG DUPLEX CONNECTOR

[75] Inventors: Norman R. Lampert, Norcross, Ga.; George J. Shevchuk, Old Bridge, N.J.

[73] Assignee: Lucent Technologies Inc., Murray Hill, N.J.

[21] Appl. No.: 520,809

[22] Filed: Aug. 30, 1995

[51] Int. Cl.⁶ .................................................. G02B 6/38
[52] U.S. Cl. .................. 385/59; 385/55; 385/56; 385/76
[58] Field of Search ........................ 385/55, 56, 59, 385/60, 71, 75, 76, 53, 135, 136, 137, 139; 439/494, 595, 596, 606, 638, 675, 676, 660, 701

[56] References Cited

U.S. PATENT DOCUMENTS

| | | | |
|---|---|---|---|
| 3,860,316 | 1/1975 | Hardesty | 439/344 |
| 4,241,974 | 12/1980 | Hardesty | 439/638 |
| 4,611,875 | 9/1986 | Clarke et al. | 439/538 |
| 4,787,706 | 11/1988 | Cannon, Jr. et al. | 385/59 |
| 4,953,929 | 9/1990 | Basista | 385/55 |
| 5,076,656 | 12/1991 | Briggs et al. | 385/71 |
| 5,121,454 | 6/1992 | Iwano et al. | 385/60 |
| 5,123,071 | 6/1992 | Mulholland et al. | 385/53 |
| 5,224,186 | 6/1993 | Kishimoto et al. | 385/78 |
| 5,312,268 | 5/1994 | Sumida | 439/364 |
| 5,335,301 | 8/1994 | Newman et al. | 385/75 |
| 5,386,487 | 1/1995 | Briggs et al. | 385/59 |
| 5,389,295 | 3/1995 | Chang et al. | 385/58 |

Primary Examiner—Rodney B. Bovernick
Assistant Examiner—Hemang Sanghavi
Attorney, Agent, or Firm—Michael A. Morra

[57] ABSTRACT

A duplex connector 300 is constructed by joining together a pair of simplex connectors 10—10 using one or more plastic clips 210. Each simplex connector includes a latch 120 for interlocking it with a jack receptacle 40, and each simplex connector includes a pair of pin-receiving holes 103–104, 163–164 on its opposite side surfaces. Each clip includes a first planar structure 211 having a pair of cylindrical pins 203–204, 263–264, having different diameters, in each of two different regions that are press-fit into the pair of simplex connectors. In one configuration, a single clip 210 is used to join the pair of simplex connectors together, side-by-side, to form a horizontally stacked duplex connector 300. In this configuration, a second planar structure 212 is pivotally attached to the top edge 214 of the first structure to prevent snagging, and to enable the user to manually deflect both latches 120—120 simultaneously. In another configuration, a pair of clips 510—510 are used to join the simplex connectors together, one on top of the other, to form a vertically stacked duplex connector 500. In this configuration, the anti-snag feature is provided by cantilever triggers 130—130 that are mounted on each simplex connector adjacent to the latches.

23 Claims, 9 Drawing Sheets

ANTI-SNAG DUPLEX CONNECTOR

CROSS REFERENCE TO RELATED APPLICATIONS

This invention is related U.S. Ser. No. 08/265,291 to J. M. Anderson et al. filed on Jul. 29, 1994; and to U.S. Ser. No. 08/520,808 to N. R. Lampert et al. filed concurrently with this patent application.

TECHNICAL FIELD

This invention relates to a duplex connector which is assembled by joining a pair of simplex connectors in a side-by-side relationship, and which resists snagging when it is pulled backwards through a concentrated area of wires and cables.

BACKGROUND OF THE INVENTION

Telephone switching offices and companies using a large number of communication devices such as modems, telephones, facsimile machines and the like are all faced with the problem of interconnecting these devices with electrical and/or optical cables. Such cables frequently reside within ducts or troughs that contain a large number of similar cables. Each cable terminates in a plug to facilitate the interconnection process. As devices are replaced, or as new interconnections are required, these cables need to be removed from the duct and replaced by others. And while adding cables to a duct is not a particularly difficult task, removing them is. Indeed, removal is accomplished by disconnecting the plug from the communication device and pulling it backwards (i.e., by its associated cable) through the duct. Since it is not desirable to sever the plug from the cable, the plug needs to be streamlined in order to avoid snagging other cables as it is pulled. Imagine, for example, the difficulty associated with pulling a plug, shaped like a fishhook, through a maze of wires; and yet the most popular plug used in the communication industry is shaped that way. (Perhaps the most widely used and accepted are know as "RJ-type" plugs which are used on all telephones and disclosed in numerous patents including U.S. Pat. No. 3,860,316 to Edwin C. Hardesty.) These plugs have achieved overwhelming acceptance by customers because they are inexpensive, operate reliably, and their operation is intuitively understood.

RJ-type plugs include a locking tab (hereinafter "cantilever latch"or "latch") for interlocking with an associated jack; but the latch snags other wires and cables when being pulled backwards through a concentrated area of wires and cables as though it were designed for this nefarious purpose. This difficulty is exacerbated by the fact that the use of such modular plugs is growing (such plugs are now designed to accommodate high speed electrical data communication). Today, even optical plugs are being designed in this same general style.

To some extent, the "snagging" problem has been overcome by including a pair of sloped sidewalls at the back end of the plug. This feature is commercially available from AT&T in its "Snagless RJ-45 Plug," and is incidentally shown in U.S. Pat. No. 4,611,875. However, such sidewalls need to be taller than the free end of the latch, which must be deflected downward in order to release the plug from an associated receptacle. Since the sidewalls are relatively close together, it is difficult to manually operate the latch.

In communication equipment, it is frequently desirable to make connection with a pair of individual transmission media and to be sure that they are correctly positioned. For example, one transmission medium may be used for transmitting data while the other is used for receiving data. In optical systems, precision alignment is critical and it is customary to use specially designed connectors for aligning each optical fiber. Nevertheless the desire for customer convenience has led to the development of duplex optical connectors which include two optical fibers and the means for aligning same. For example, U.S. Pat. No. 4,787,706 discloses a duplex optical fiber connector for terminating a cable containing a pair of buffered optical fibers—each held within a fiber-holding assembly comprising a ferrule and a spring-loaded base member The fiber-holding assemblies are contained within a common housing that is formed to include two flexible molded plastic sidearm members for interlocking with a mating receptacle. The housing includes details which can be used for assuring polarization during interconnection with another optical fiber connector. And while this connector provides excellent performance, it requires its own family of connecting apparatus and does not interconnect with apparatus designed for unitary (simplex) connectors.

U.S. Pat. No. 4,953,929 discloses a duplex connector which is constructed by joining two simplex connectors together. However, the simplex connectors shown are not RJ-type, and if they were, there would be a snagging problem.

What is needed, and seemingly, what is unavailable in the prior art, is a duplex connector which is constructed from a pair of RJ-type simplex connectors, and which resists snagging when pulled backwards through a concentrated area of wires and cables. Desirably, this duplex connector should be inexpensive, easy to assemble, and easy to manually operate when installed in a dense array of similar connectors.

SUMMARY OF THE INVENTION

The foregoing problems of the prior art are overcome by apparatus for joining a pair of simplex connectors together with a duplex clip to form a duplex connector. Each simplex connector has a plug end for insertion into a jack receptacle and a cable-entrance end for receiving a cable containing a transmission media. Each simplex connector comprises a generally rectangular shape having a latch mounted on its top-side surface for interlocking with the jack receptacle. Each simplex connector further comprises one or more pin-receiving holes on its left- and right-side surfaces. The duplex clip includes a first planar structure having one or more pins that are press-fit into the pin-receiving holes of the simplex connectors. The duplex connector has an anti-snag feature comprising one or more cantilever members that are adapted to engage the latches on the simplex connectors.

In one illustrative embodiment, the anti-snag feature is built into the duplex clip and comprises a second planar structure that is pivotally attached to the top edge of the first planar structure. The second planar structure enables a user to manually deflect the latch on each of the two simplex connectors simultaneously. In this embodiment, the simplex connectors are joined together in a side-by-side array by a duplex clip which has a pair of cylindrical pins of on opposite sides of the first planar structure.

In another illustrative embodiment, the anti-snag feature is built into the simplex connectors themselves, each of which includes a cantilever trigger that is mounted on its top-side surface with a fixed end positioned toward the cable-entrance end of the connector and a free end adapted to engage the cantilever latch. In this embodiment, the simplex connectors are joined together along their bottom side surfaces by a pair of duplex clips so that one latch and trigger pair is located on each of two opposite sides of the duplex connector.

BRIEF DESCRIPTION OF THE DRAWING

The invention and its mode of operation will be more clearly understood from the following detailed description when read with the appended drawing in which.

DETAILED DESCRIPTION

Figure 1:
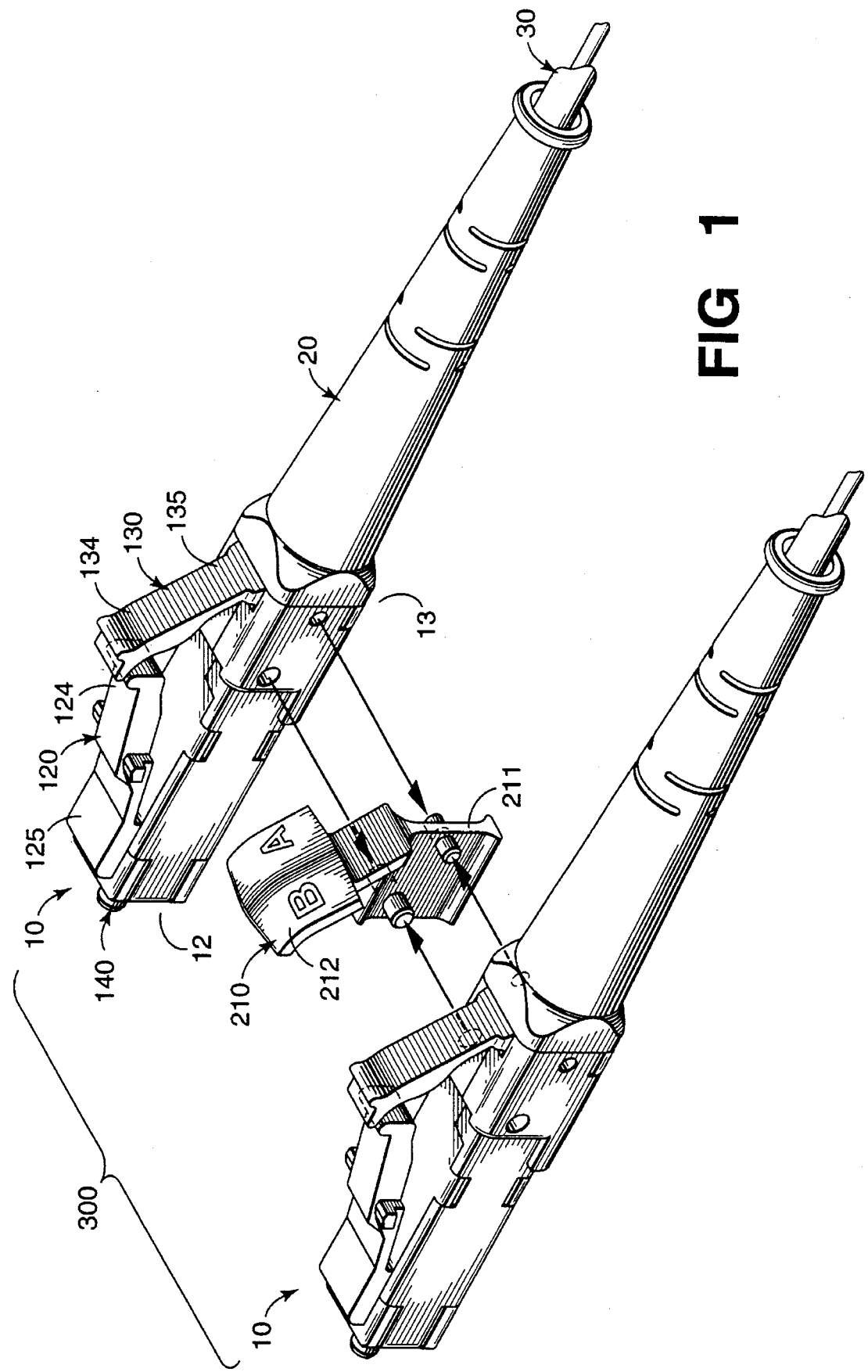
FIG. 1 is a perspective view of a pair of simplex optical connectors, each having a latch and an anti-snag trigger, that are about to be assembled into a duplex connector via a duplex clip.

FIG. 1 is a perspective view of one embodiment of an anti-snag duplex connector 300 formed by joining together a pair of simplex optical connectors 10 with a single duplex clip 210. Each simplex connector illustratively includes a locking tab (hereinafter "latch") 120 and an anti-snag trigger 130. Each simplex connector terminates an optical cable 30 and illustratively includes a bend-limiting, strain-relief boot 20 which protects the optical fiber transmission medium within the cable 30 and limits the minimum radius of curvature which can be imposed on the fiber. Connector 10 comprises a plug end 12 which is inserted into a jack receptacle, and a cable-entrance end 13 which receives the optical cable. An optical connection is made, for example, by butting the end face of ferrule 140 up against the end face of another ferrule which is precisely aligned with it, or with a device such as an optical source or detector. The outside surface of the connector 10 includes a latch 120 for securing the connector to a jack receptacle in order to prevent unintended decoupling therebetween. Latch 120 is molded into the connector and includes a "living hinge" which allows it to be moved up and down in a direction that is perpendicular to a central axis 101 (see FIG. 8) of the connector. Similarly, a trigger 130 is molded into the connector and includes a living hinge which allows it to be moved up and down in a direction which is perpendicular to the central axis of the connector. Latch 120 and trigger 130 are cantilever beams whose longitudinal axes reside in the same plane that includes the central axis of the connector. Each of these cantilever beams includes a fixed end 125, 135 and a free end 124, 134; and their free ends are arranged to interact with each other. When trigger 130 is depressed, its free end 134 engages the free end 124 of latch 120 in order to release the connector 10 from a jack receptacle 40 (see FIG. 2). The free end of trigger 130 is positioned above the free end of latch 120 so that when the trigger is depressed, its free end 134 slides over the free end 124 of the latch and urges it downward. Significantly, the trigger facilitates activation of the latch by effectively extending its length. Trigger 130 extends in a direction which is parallel to the central axis of the connector, and can be made relatively narrow so that when connectors are positioned side-by-side in a dense array, each individual trigger can be manually accessed with minimum interference from an adjacent trigger. More importantly, the trigger 130 is sloped in a manner that prevents snagging when pulled backward (by cable 30) through a concentrated area of wires and cables.

In this illustrative embodiment of the invention, a duplex clip 210 is used to join the simplex connectors 10—10 together, side-by-side, to form a horizontally stacked duplex connector 300. The duplex clip comprises a first planar structure 211 that includes pins that are parallel to each other but extend perpendicular to the plane of structure 211. These pins are press-fit into pin-receiving holes in the left- and right-side surfaces of the simplex connectors to join them into a single unit. Duplex clip 210 further includes a second planar structure 212 which is pivotally attached to the first planar structure 211 and perpendicular thereto. The second planar structure 212 is positioned to engage the latches 120 on each of the simplex connectors 10 and to deflect them toward the central axis 101 of the housing (see FIG. 8).

Figure 3:
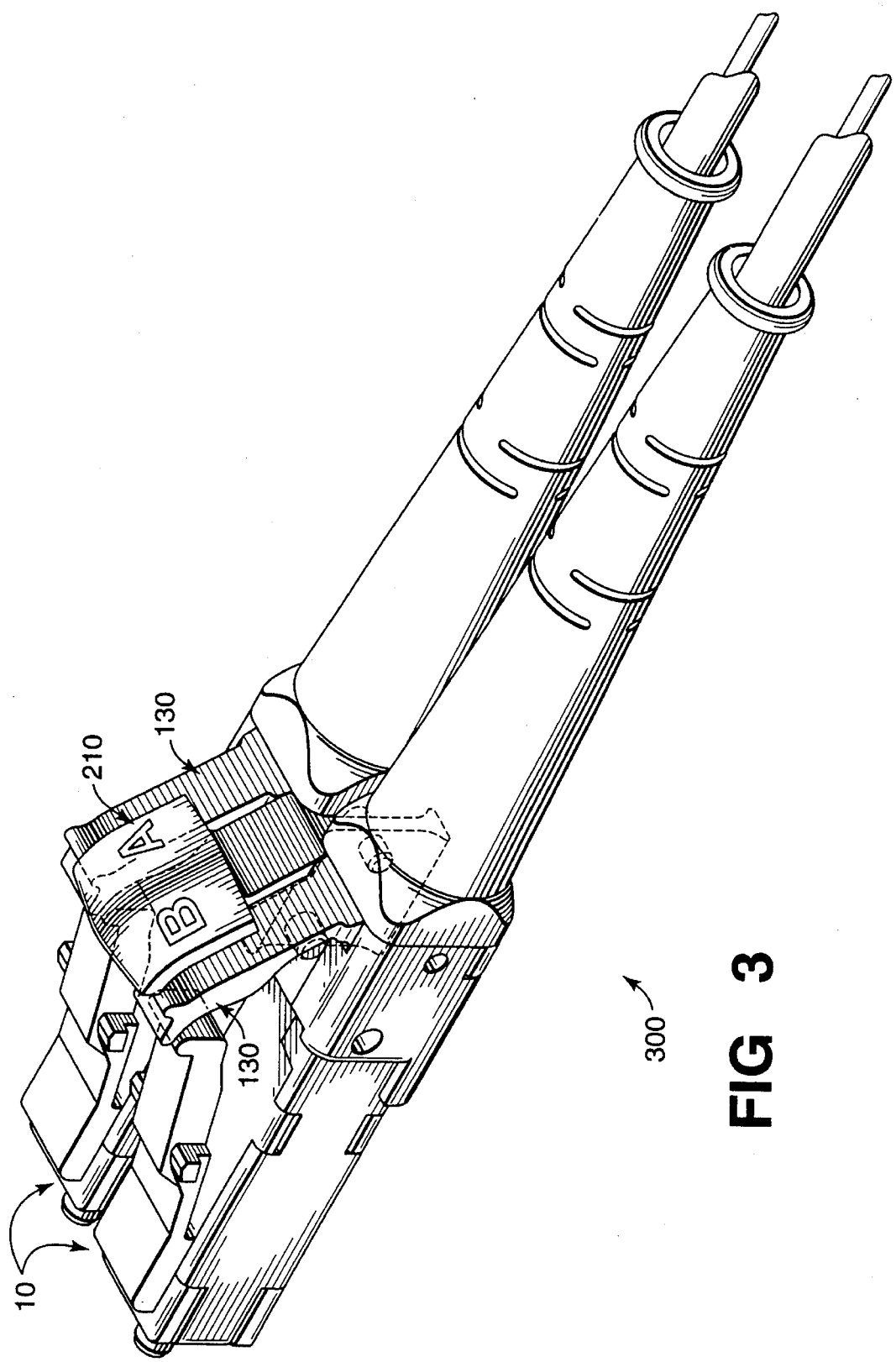
FIG. 3 is a perspective view of one embodiment of the duplex connector assembled in the manner shown by FIG. 1.
Figure 4:
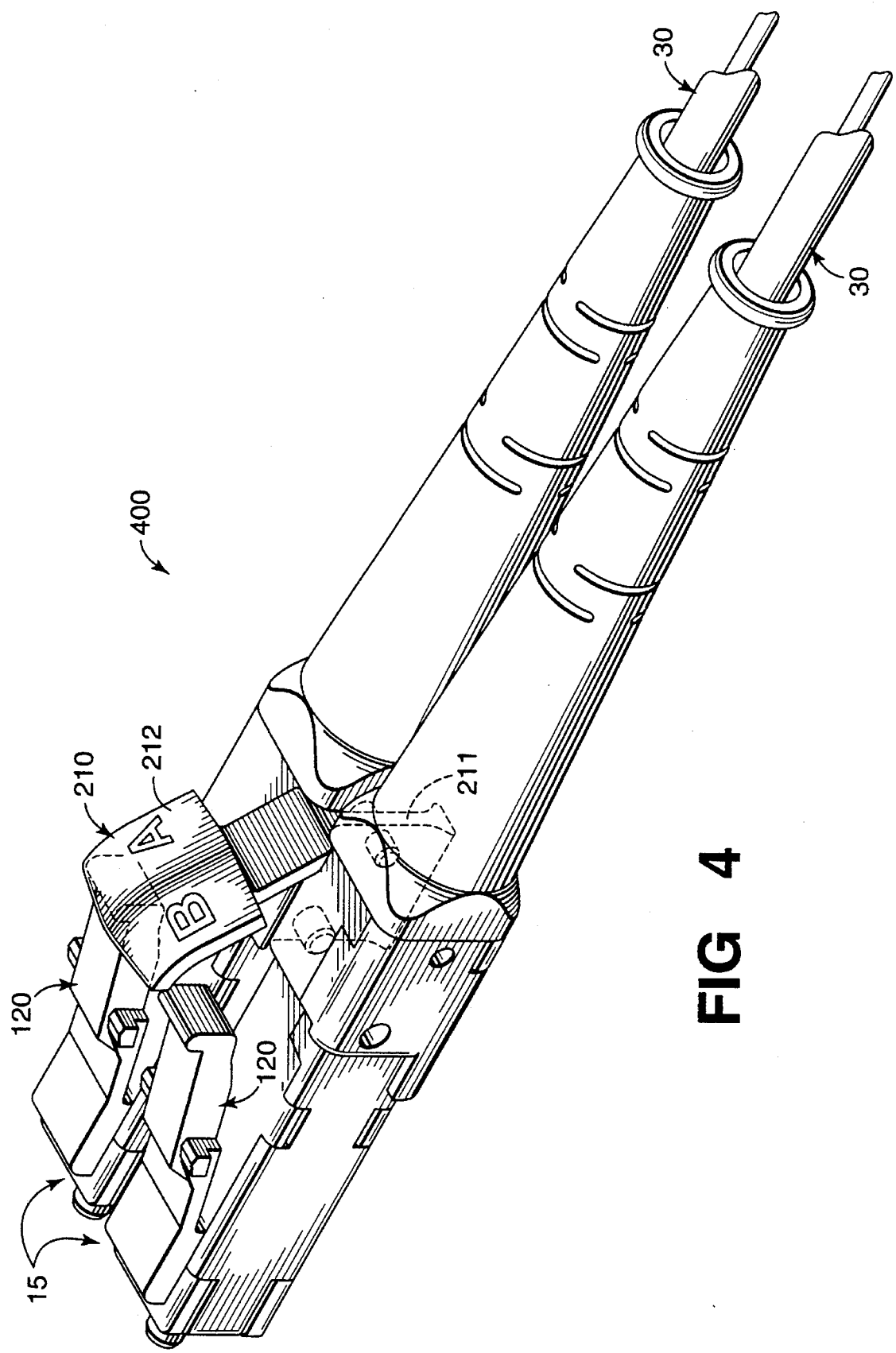
FIG. 4 is a perspective view of another embodiment of the duplex connector assembled in the manner shown by FIG. 1.

The second planar structure 212 is particularly useful in situations where the pair of simplex connectors used in constructing the duplex connector do not include anti-snag triggers 130. This situation is disclosed in FIG. 4 where each simplex connector 15 includes a latch 120, but does not include an anti-snag trigger. Simplex connectors 15—15 are held together by pins that are attached to and extend from opposite sides of a common planar structure 211. These pins mate with complementary holes in the left-and right-side surfaces of the simplex connectors 15—15. The latches 120 on the resulting duplex connector 400 are kept from snagging by means of structure 212 which is a cantilever having its fixed end pivotally attached to planar structure 211 in such a manner that the duplex connector 400 resists snagging when pulled by its associated cables 30—30. The free end of cantilever 212 directly engages latches 120—120 when depressed by a user to release the connector 400 from a receptacle. Accordingly, FIG. 4 illustrates that duplex clip 210 can be used with simplex connectors 15—15, which do not include anti-snag triggers, to construct anti-snag duplex connector 400. In the same manner, FIG. 3 illustrates that duplex clip 210 can be used with simplex connectors 10—10, which include anti-snag triggers 130—130, to construct anti-snag duplex connector 300.

Figure 2:
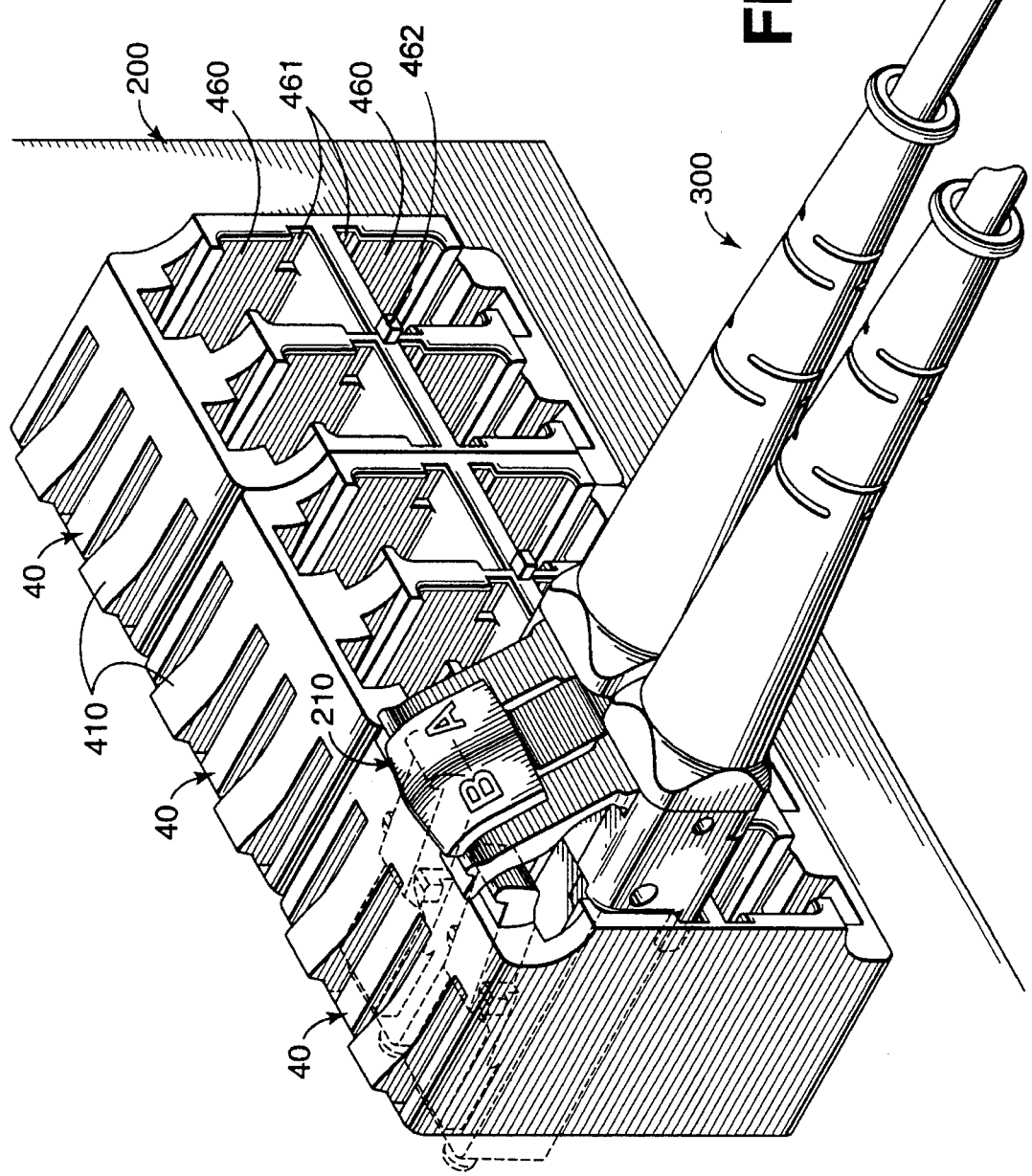
FIG. 2 is a perspective view of the duplex connector installed in a jack receptacle.

In the above illustrative embodiments of the invention, each simplex connector has a footprint (cross-section dimension) of only 4.6 by 4.6 millimeters (mm), and a large number of such connectors can be grouped in a compact array as illustrated by FIG. 2. Here, three quadruplex jack receptacles 40 are shown, each accommodating up to four individual simplex connectors. Advantageously, duplex clip 210 enables a pair of simplex connectors to be joined together in a side-by-side array to form a duplex connector 300 which fits into cavities 460—460 that were designed to accommodate simplex connectors. However, when a duplex connector is inserted, each receptacle 40 includes features that only allow it to fit in certain specific orientations. For example, a post 462 is used to preclude certain orientations of the vertically stacked duplex connector shown in FIG. 5; while the recesses 461 are instrumental in precluding certain orientations of the horizontally stacked duplex connectors shown in FIG. 3 and 4.

The front side of the receptacles 40 are shown protruding through a flat panel 200. Receptacle 40 installs in a rectangular opening of the panel 200 by pushing its narrow end through the opening. The receptacle is held therein by latches 410, and may be removed from the panel by squeezing these latches and pushing the receptacle 40 toward the panel 200.

Figure 5:
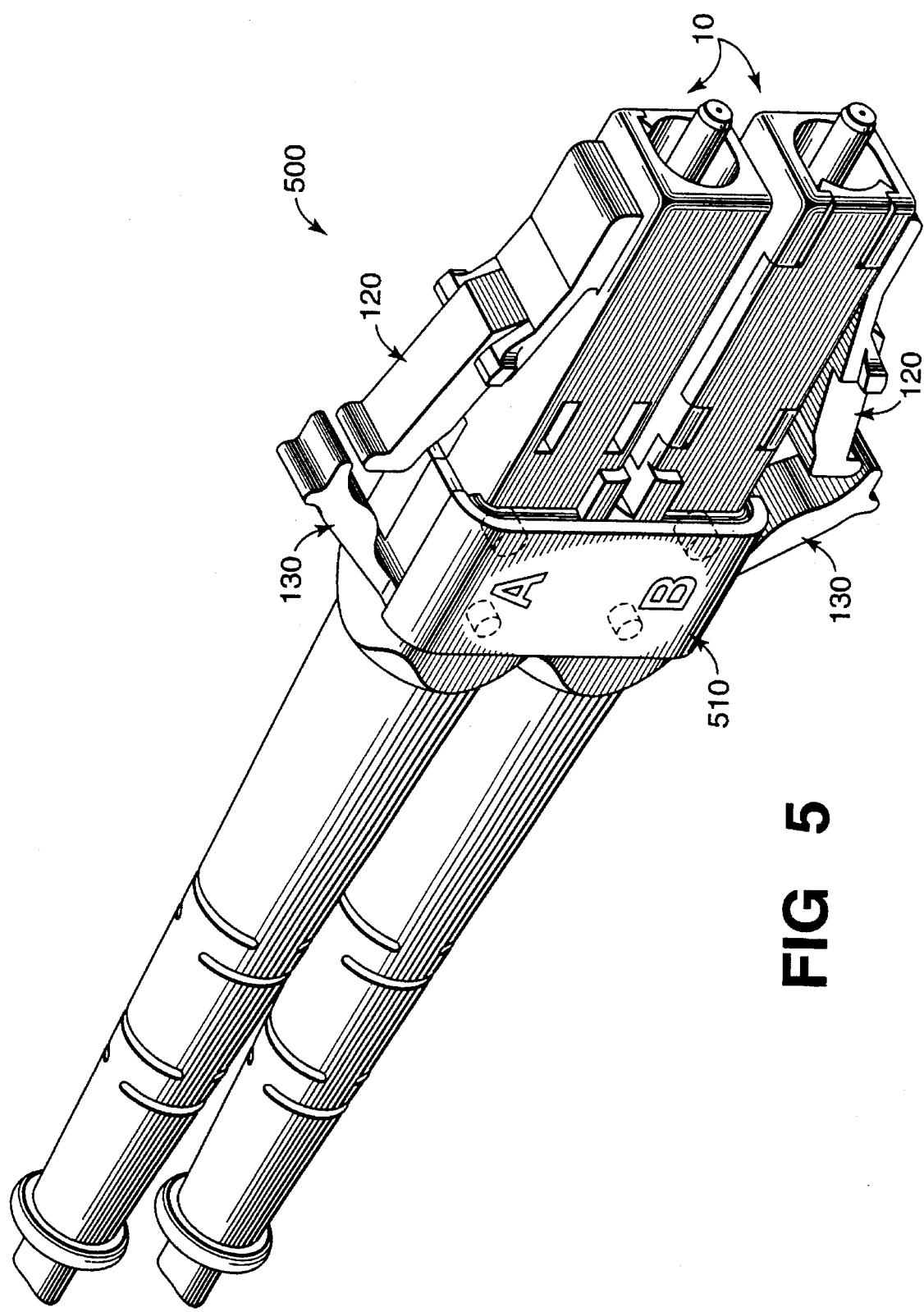
FIG. 5 shows yet another embodiment of a duplex connector formed by joining together a pair of simplex connectors which individually include anti-snag triggers.

Yet another embodiment of a duplex connector is shown in FIG. 5 in which a pair of clips 510—510 are used to join optical simplex connectors 10—10 together, one on top of the other, to form a vertically stacked duplex connector 500. In this configuration, the anti-snag feature is provided by cantilever triggers 130—130 that are mounted on each simplex connector adjacent to the latches 120—120. It is noted that duplex connector 500 can only be inserted into receptacle 40 (see FIG. 2) with the clip 510 attached to one of its sides because of interference between clip 510 and post 462. As indicated above, post 462 is used to assure correct polarization (i.e., it assures that duplex connector 500 is inserted into the correct cavities 460—460 of quadruplex jack receptacle 40).

Figure 6:
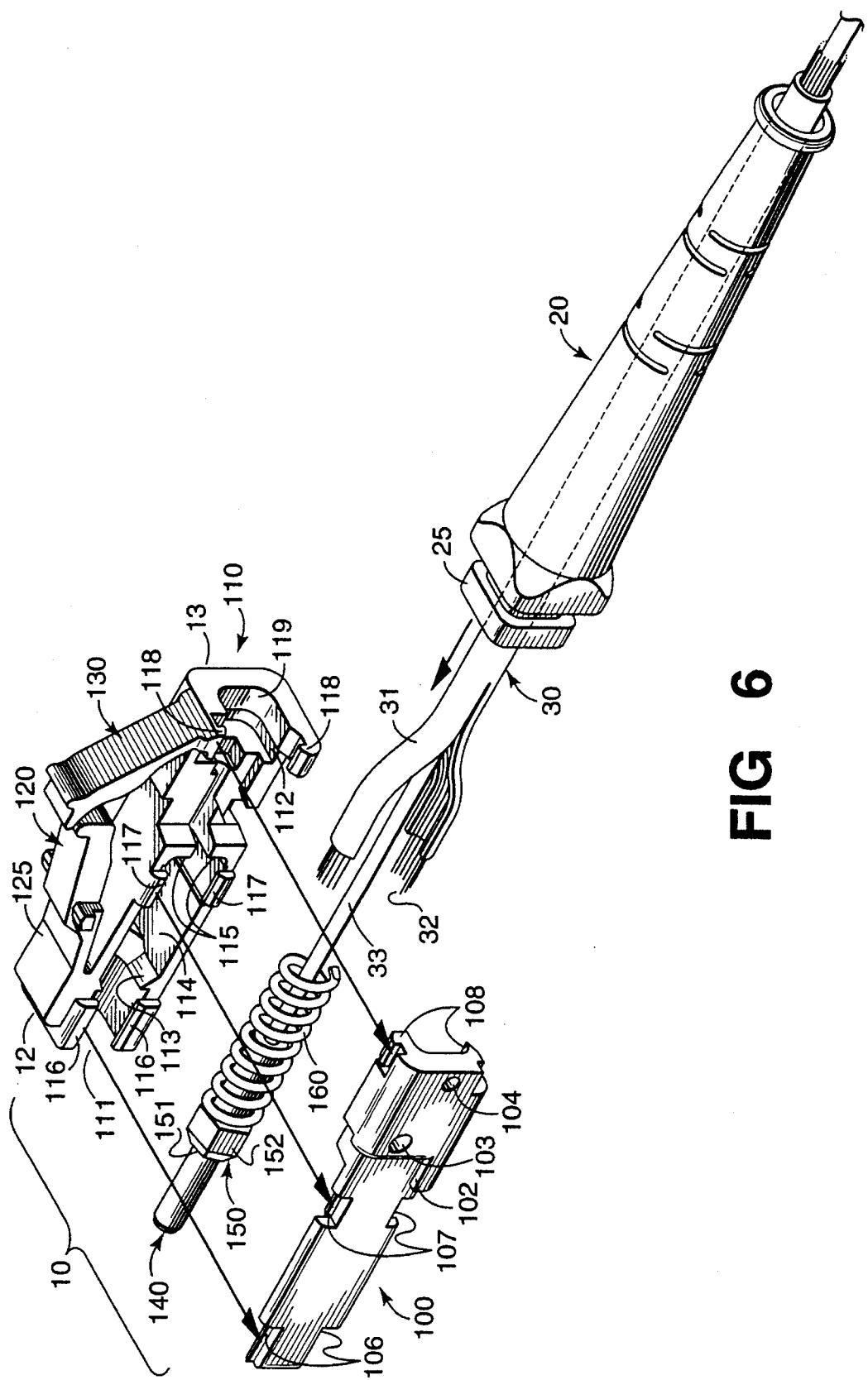
FIG. 6 is an exploded perspective view of a simplex optical connector which includes an anti-snag trigger, showing its associated components.

FIG. 6 is an exploded perspective view of a simplex optical connector which includes an anti-snag trigger, showing its associated components. In particular, FIG. 6 discloses construction details of a connector 10 which includes housing 110, cover 100, and a fiber-holding structure comprising ferrule 140, base member 150, and spring 160 which is disposed about the base member. Although the fiber-holding structure is shown as a two-piece assembly, it can be a one-piece unit. Housing 110 is a generally U-shaped structure having a first cavity 114 at its front end for receiving the fiber-holding structure, and having a second cavity 112 at its back end for receiving a flange 25 on a strain relief boot 20. The cover 100 is joined to the housing 110 after the fiber-holding structure and the flange are installed therein. Cover 100 includes snap features 106–108 that interlock with mating snap features 116–118 on housing 110. Once locked together, the front end of the connector has a generally square shape which fits into a receptacle 40 (FIG. 2) that is shaped to receive same. The connector 10 includes a first opening 119 at its cable-entrance end 13 which receives an optical cable 30, and a second opening 111 at its plug end 12 for enabling the end face of the fiber-carrying structure to protrude therethrough. These openings 111, 119 respectively extend into cavities 114, 112 and are positioned at opposite ends of connector 10. Housing members 100, 110 are molded from a thermoplastic material such as polycarbonate. The latch 120 and trigger 130 are molded into the housing 110.

Cylindrical ferrule 140 is held within a mating opening of base member 150. A compression spring 160 surrounds the back portion of the base member, and simultaneously presses against an interior surface 115 of the cavity 114 and the back side of a flange 152 on the base member. A chamfered surface 151 on the front side of flange 152 cooperates with an inclined surface 113 within the cavity 114 to selectably seat the base member 150 within the housing 110 in one of six different stable positions. Compression spring 160 urges the end face of ferrule 140 through opening 111. The ferrule may be a glass, metal, ceramic or plastic cylinder having a narrow passageway (about 126 μm in diameter) through its central axis for receiving an end portion of an optical fiber. Preferably, the ferrule has an outer diameter of about 1.25 mm and a length of about 7.0 mm. In the construction of an optical cable 30, a thin glass fiber is typically coated with two layers of ultraviolet-curable materials (polyacrylate for example) for protection. The coated fiber is then covered with a thermoplastic having sufficient stiffness to preclude fiber buckling and is referred to as a buffered fiber 33. To withstand tensile forces that might otherwise fracture the buffered fiber, the cable is constructed with a load-bearing portion in the form of strength members 32 that surround the buffered fiber. Elongated slender polymeric fibers of high tensile strength, such as aramid yarn, are suitable for this purpose. An outer jacket 31 comprising polyvinyl chloride, for example, surrounds the buffered fiber and strength members to complete the construction of optical cable 30. These layers of different materials are all stripped from the end portion of the glass fiber prior to its insertion into ferrule 140. An adhesive is injected into the passageway through the central axis of ferrule 140. Then the uncoated portion of the optical fiber is inserted into the passageway of the ferrule and adhesively attached. The spring 160 is pre-compressed on the ferrule/base member subassembly 140/150 with cable, and is inserted into housing 110. Additionally, strength members 32 of the cable 30 are folded back around flange 25 of the strain-relief boot 20 and an adhesive is applied thereto. (A suitable adhesive for bonding the strength members to the connector is Hysol 151—a commercially available, two-part epoxy.) Flange 25 is then pressed into cavity 112 at the back end of housing 110 so that the cable jacket 31 and the strength members 32 are "sandwiched" between the flange and the sidewalls of cavity 112. Cover 100 is then snapped onto the housing. It is desirable that the cable 30 remain attached to connector 10 when an axial pull of at least 10 pounds is applied to cable 30.

Strain-relief boot 20 is about 38 mm long and is made from a suitably compliant material so that its back portion can be bent in a direction that is perpendicular to its central axis. Illustratively, the strain-relief boot is made from a thermoplastic rubber such as Santoprene® elastomer which is commercially available from Advanced Elastomer Systems, LP. Strain-relief boot 20 is conically shaped and tapers from a maximum diameter of about 5.6 mm at one end 22 to a minimum diameter of about 3.0 mm at the other end 24. Not only does the boot 20 provide strain relief for cable 30, but it also insures that the cable can withstand repeated bends after interconnection without undue stress being imparted to the glass fiber.

Figure 7:
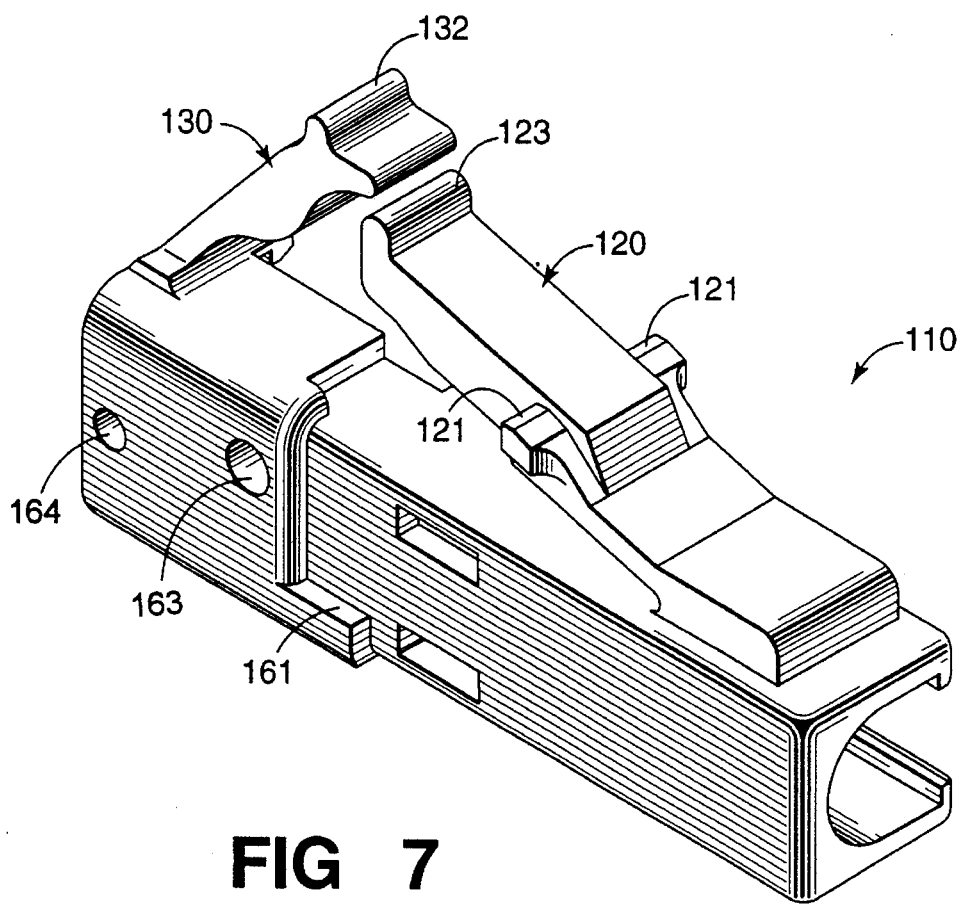
FIG. 7 is a front, top and right side perspective view of a housing for the connector shown in FIG. 6.
Figure 8:
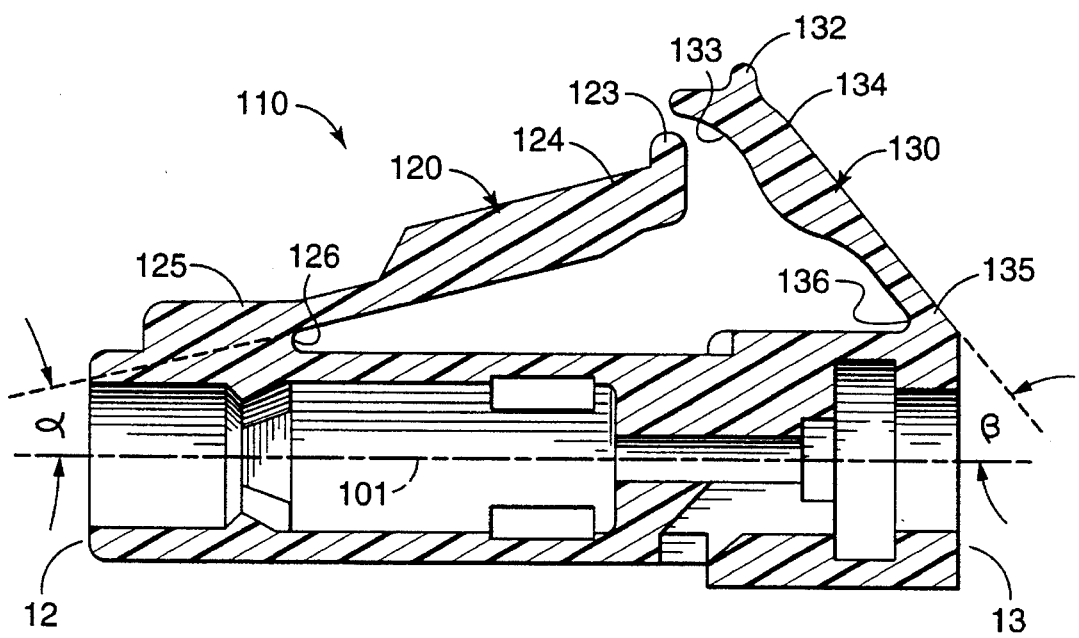
FIG. 8 is a cross-section view of the housing for the connector shown in FIG. 6.

It is desirable that latch 120 not snag other wires and cables when pulled through a concentrated area of same, and trigger 130 prevents such snagging. Moreover, trigger 130 makes latch 120 easier to use as discussed below. Referring now to FIG. 7 and 8, the cooperative relationship between latch 120 and trigger 130 is more fully explored. FIG. 7 is a front, top and right-side perspective view of housing 110; and FIG. 8 is a cross-section view of the housing. Housing 110 includes a reinforcement ledge 161 which cooperates with a mating recess 461 (FIG. 2) within the associated jack receptacle to keep the optical connector 10 from moving when a side load is applied to the connector. A similar reinforcement ledge 102 is molded into the side of cover 100 (see FIG. 6) for the same purpose.

Holes 163, 164 are molded into the side of housing 110 so it can be easily joined to another optical connector in a duplex or higher-order assembly. In order to maintain proper polarization of the connectors, the holes 163, 164 have different diameters and can only be attached to a duplex clip in one particular orientation. A similar pair of holes 103, 104 is molded into the side of cover 100 (see FIG. 6) for the above-described purpose, and they also have different diameters.

Formed integrally with the dielectric housing 110 is a resilient latch which is designated generally by the numeral 120. The latch is approximately 2.3 mm wide, 9.0 mm long, and has a minimum thickness of about 0.65mm. The latch 120 includes a pair of shoulders 121—121 which are positioned on its opposite sides. These shoulders are automatically deflected downward during insertion into an associated jack receptacle. Also formed integrally with the dielectric housing 110 is a resilient trigger which is designated generally by the numeral 130. The trigger is approximately 2.3 mm wide, 7.5 mm long, and has a minimum thickness of about 0.65 mm.

As best can be seen in FIG. 8, latch 120 comprises a cantilever beam having its fixed end 125 positioned toward the plug end of the housing 110, and its free end 124 positioned toward the cable-entrance end 13 of same. Latch 120 is molded so that its longitudinal axis is oriented at an angle α (approximately 15°) with respect to the central axis 101 of the housing 110. The region 126 where the latch meets the top surface of the housing has a radius of curvature of approximately 0.25 mm. Trigger 130 comprises a cantilever beam having its fixed end 135 positioned toward the cable-entrance end 13 of the housing 110, and its free end 134 positioned toward the plug end 12 of same. The free end of the trigger includes a protruding surface 132 that assists in operating the trigger. Surface 132 enhances the manual operation of the trigger 130, enabling it to be easily operated in a high density application, either manually or with the tip of a pen. Optionally, surface 132 includes a plurality of ridges. Trigger 130 is molded so that its longitudinal axis is oriented at an angle β (approximately 50°) with respect to the central axis 101 of housing 110. The region 136 where the trigger meets the top surface of the housing has a radius of curvature of approximately 0.25 mm. The bottom side of trigger 130 includes a camming surface 133 which slides along a surface 123 of the latch 120 when the trigger is pressed downward. As the trigger is pressed downward toward the central axis 101 of the housing, so too is the latch. It is an advantage of the present invention that the use of such a trigger effectively extends the length over which the latch may be operated. Additionally because the user is reaching toward the housing 110 from the cable entrance end thereof, it is an advantage that the user's fingers push toward the housing to operate the trigger, and hence the latch. So that these surfaces will engage each other properly, the trigger is positioned above, and overhangs, the latch. And although camming surface 133 is preferably shaped like the letter "S," it is understood that other shapes are effective in the practice of the invention.

Reference is now made to FIG. 9–12 in connection with duplex clip 210; and reference is also made to FIG. 13–16 in connection with duplex clip 510. Duplex clips 210, 510 (also referred to as "separators") attach to each of the simplex connectors and maintain a predetermined separation therebetween. And although they are shown as individual piece parts, it is clear that they can be molded into a unipartite housing. The front end of such a unipartite housing would comprise the front portions of the disclosed simplex connectors and be suitably shaped and separated to fit into a pair of adjacent cavities 460—460 (see FIG. 2) in jack receptacle 40.

Figure 9:
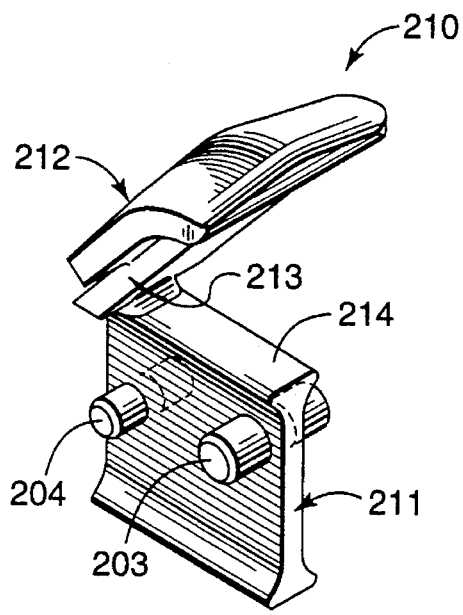
FIG. 9-12 shows various views of the duplex clip used in the embodiments disclosed in FIG. 1-4.
Figure 10:
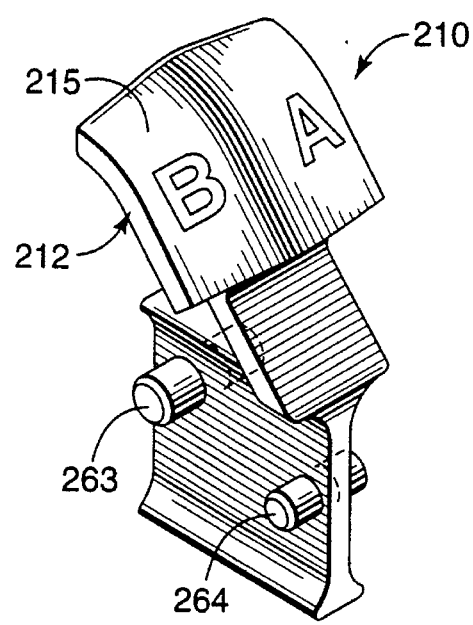
Figure 11:
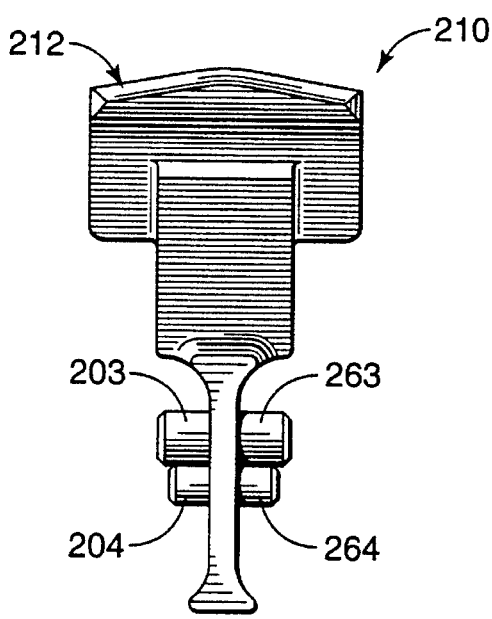
Figure 12:
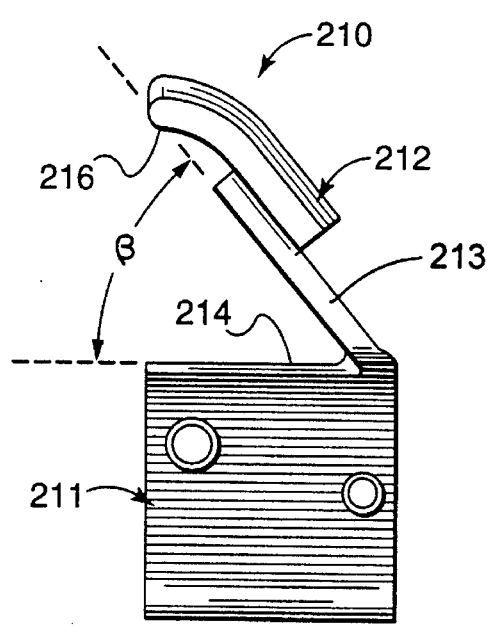
Figure 13:
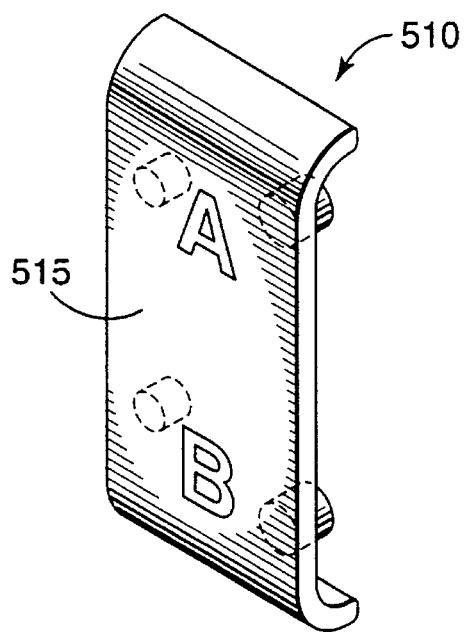
FIG. 13-16 shows various views of the duplex clip used in the embodiment disclosed in FIG. 5.
Figure 14:
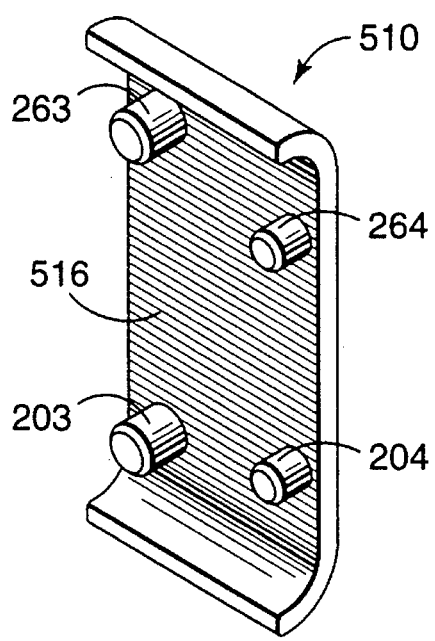
Figure 15:
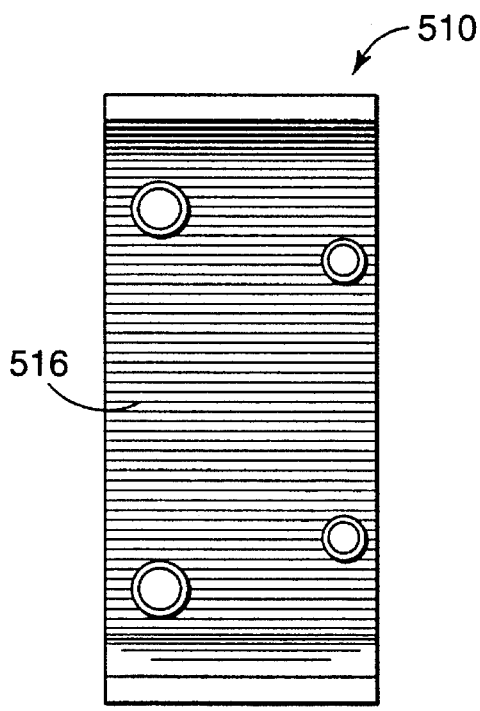
Figure 16:
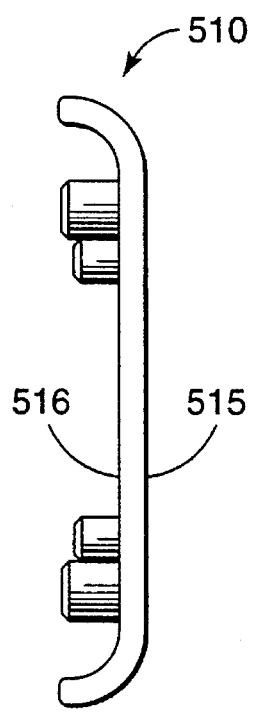

In the preferred embodiment, however, the duplex clips 210, 510 are individual piece parts that include two pairs of pins. One pair of pins 263,264 is inserted into mating holes 163, 164 (see FIG. 7) of one simplex connector; and the other pair of pins 203,204 is inserted into mating holes 103, 104 (see FIG. 6) of another simplex connector. The nominal diameter of the pins 203,263 and pin-receiving holes 103, 163 is 1.15 mm; and the nominal diameter of pins 204, 264 and pin-receiving holes 104, 164 is 0.90 mm. However, to assure a substantially permanent connection between the pins and the pin-receiving holes, an interference is 0.025 mm is illustratively used (i.e., each pin has a diameter which exceeds the diameter of its corresponding pin-receiving hole by about 0.025 mm). Nevertheless, so that the pins can be readily inserted into slightly smaller holes, the end portion of each pin includes a chamfer. In FIG. 9, duplex clip 210 comprises first and second generally planar structures 211 and 212 respectively. The top edge 214 of planar structure 211 includes a living hinge 213 which has a radius of curvature of approximately 0.25mm, connects to planar structure 212, and is suitably thin (minimum thickness approximately 0.65 mm) to withstand repeated flexing without breaking. In FIG. 10, it is noted that the outside surface 215 of the second planar structure 212 is illustratively inscribed with information (here the letters A and B are used) that help identify the polarization of the connector. Moreover, the duplex clip 210 can be molded from different color plastic materials for improved identification when installed in a panel containing many other duplex connectors. As illustrated in FIG. 12, planar structure 212 forms an acute angle β (approximately 50°) with respect to the top edge 214 of planar structure 211. After attachment to a pair of simplex connectors, this acute angle points toward the cable-entrance end of the connectors, and clip 210 thus resists snagging. Also illustrated in FIG. 12 is the preferably curved inside surface 216 of planar structure 212 which, in one embodiment of the invention (FIG. 3) cooperates with trigger 130 to deflect latch 120, and in another embodiment of the invention (FIG. 4) cooperates directly with latch 120.

FIG. 13–16 discloses details of duplex clip 510 which is used in assembling a pair of simplex connectors to form a duplex connector 500 in the manner shown in FIG. 5. Each duplex clip 510 includes an inside surface 516 having two pairs of pins 203–204, 263–264 for attachment to mating holes 103–104, 163–164 (see FIG. 6, 7) in a pair of vertically stacked simplex connectors 10—10. Outside surface 515 is illustratively inscribed with information (here the letters A and B are used) that would help identify the polarization of the resulting duplex connector 500. Moreover, duplex clip 510 can be molded from different color plastic materials for improved identification when installed in a panel containing many other duplex connectors.

Although a particular embodiment of the present invention has been shown and described, various modifications are possible within the spirit and scope of the invention. These modifications include, but are not limited to, the use of different shapes, positioning, and quantity of pins and holes. Moreover, the present invention envisions a duplex connector in which the clips are not separate parts; but rather, are molded into the structure of the housing. And while only optical connectors are shown, it is understood that the present invention includes duplex electrical connectors as well as duplex hybrid connectors (i.e., the combination of an optical connector with an electrical connector).

We claim:

1. A duplex connector comprising a pair of simplex connectors joined by a duplex clip, each simplex connector comprising a generally rectangular housing having: (i) a plug end for insertion into a mating receptacle, (ii) a cable-entrance end for receiving a cable containing a transmission medium, and (iii) top-, bottom-, left-, and right-side surfaces; said duplex clip comprising a first planar structure having one or more pins which extend in a direction that is generally perpendicular to the first planar structure, said left- and right-side surfaces including one or more pin-receiving holes therein for interconnection with the duplex clip, CHARACTERIZED IN THAT:

each housing further includes a latch mounted on its top-side surface for securing it to a receptacle, said latch being movable toward the bottom-side surface of the housing; and the duplex connector further includes at least one cantilever member for slidably engaging the latch to release the housing from the mating receptacle, said cantilever member forming an acute angle with the top-side surface of the housing that points in a direction away from the plug end of the housing toward the cable-entrance thereof.

2. The duplex connector of claim 1 wherein the cantilever member comprises a second planar structure, pivotally attached to the first planar structure and perpendicular thereto, said second structure being positioned to engage the latch on each of the simplex connectors and to deflect them toward the bottom-side surface of the housing.

3. The duplex connector of claim 1 wherein the cantilever member comprises a cantilever trigger, mounted on the top-side surface of each simplex connector housing, each cantilever trigger forming an acute angle with the top side surface of the housing that points in a direction away from the plug end of its associated connector toward the cable-entrance end thereof.

4. The connector of claim 1 wherein the transmission medium comprises an optical fiber.

5. The connector of claim 2 wherein the duplex clip is molded from a thermoplastic material, said first planar structure being hinged to the second planar structure by portions of the thermoplastic material which are suitably thin to withstand repeated flexing without breaking.

6. The connector of claim 5 wherein the thermoplastic material includes polycarbonate.

7. The connector of claim 1 wherein said one or more pins are cylindrical.

8. A duplex connector comprising a pair of simplex connectors joined by a pair of clips, each simplex connector comprising a generally rectangular housing having: (i) a plug end for insertion into a mating receptacle, (ii) a cable-entrance end for receiving a cable containing a transmission medium, and (iii) top-, bottom-, left-,and right-side surfaces, the left- and right-side surfaces including one or more pin-receiving holes therein for interconnection with the clips; each clip comprising a generally planar structure having a plurality of pins on an inside surface thereof, said pins extending in a direction that is perpendicular to the clip, CHARACTERIZED IN THAT:

each simplex connector includes a cantilever latch mounted on its top side surface for securing it to a receptacle, said latch being movable toward its bottom-side surface;

each simplex connector further includes a cantilever trigger, mounted on its top-side surface, for slidably engaging the latch to release the housing from the receptacle, the cantilever trigger forming an acute angle with the top-side surface that points in a direction away from the plug end of the housing toward the cable-entrance end of the housing; and the simplex connectors are joined together along their bottom-side surfaces so that the cantilever triggers and latches are on opposite sides of the duplex connector.

9. The connector of claim 8 wherein the transmission medium comprises an optical fiber.

10. In combination, a pair of simplex connectors joined by a duplex clip:

each simplex connector terminating a transmission medium and comprising a generally rectangular housing which includes: (i) a plug end for insertion into a receptacle, (ii) a cable-entrance end for receiving the transmission medium, (iii) top-, bottom-, left-, and right-side surfaces, the left- and right-side surfaces including one or more pin-receiving holes therein for interconnection with the duplex clip, and (iv) a latching member mounted on the top-side surface for securing the housing to a receptacle;

the duplex clip comprising a first planar structure having one or more pins for for interconnection with the pin-receiving holes of the simplex connectors; and means for slidably engaging the latching members to release each of the housings from the receptacle and for precluding the latching members from snagging other wires and cables when the simplex connectors are pulled by their transmission media.

11. The combination of claim 10 wherein the duplex clip joins the left-side surface of one simplex connector to the right-side surface of the other simplex connector.

12. The combination of claim 11 wherein the duplex clip further includes a second planar structure, pivotally attached to the first planar structure and perpendicular thereto, the second planar structure being movable in a direction that is co-planar with the first structure for deflecting the latch toward the bottom-side surface of the connector.

13. The combination of claim 12 wherein the duplex clip is molded from thermoplastic material, and the movable attachment between the first and second planar surfaces comprise a living hinge that joins the planar surfaces.

14. The combination of claim 10 wherein the duplex clip joins the bottom-side surface of one simplex connector to the bottom-side surface of the other simplex connector.

15. The combination of claim 14 wherein said means for slidably engaging the latching members comprises a cantilever trigger mounted on the top-side surface of each housing.

16. The combination of claim 10 wherein the duplex clip includes two pairs of cylindrically shaped pins, the pins within each pair having different diameters.

17. The combination of claim 10 wherein the pins and pin-receiving holes are cylindrically shaped, each pin being slightly larger in diameter than its corresponding pin-receiving hole.

18. The combination of claim 10 wherein the duplex clip and the connector are made from thermoplastic material.

19. The combination of claim 18 wherein the thermoplastic material includes polycarbonate.

20. The combination of claim 10 wherein the transmission media comprise optical fibers.

21. A duplex connector comprising a pair of spaced-apart optical plugs at its front-end that are adapted to fit into a pair of adjacent cavities in a jack receptacle, the optical plugs being spaced apart from each other by a separator; each plug comprising a fiber-holding structure enclosed within a plastic housing having a latching tab molded into its exterior surface for interlocking the plug with the jack receptacle, said latching tab comprising a cantilever whose fixed end is positioned toward the front-end of the duplex connector and whose free end is positioned toward a back end of the duplex connector, said duplex connector further comprising at least one release member for engaging the latching tabs to release the optical plugs from the jack receptacle, said release member comprising a cantilever whose fixed end is positioned toward the back end of the duplex connector and whose free end is positioned toward the front end of the duplex connector.

22. The duplex connector of claim 21 wherein the fiber-holding structure comprises: a cylindrical ferrule, a base member, and a compression spring; the base member having a front portion which attaches to the ferrule and a back portion which is surrounded by the compression spring, said ferrule and base member each including an axial passageway for receiving an end portion of an optical fiber.

23. The duplex connector of claim 21 wherein the separator comprises a plastic part that attaches to each of the optical plugs and maintains a predetermined separation therebetween.

* * * * *